United States Patent
Kalopissis et al.

[15] 3,649,160
[45] Mar. 14, 1972

[54] DYEING HUMAN HAIR WITH OXIDATION BASES AND AN INDOLINE COUPLER

[72] Inventors: Gregoire Kalopissis, Paris; Andree Bugaut, Boulogne sur Seine; Hubert Gaston-Breton, Paris, all of France

[73] Assignee: Societe Anonyme dite: L'Oreal, Paris, France

[22] Filed: May 8, 1969

[21] Appl. No.: 823,168

[30] Foreign Application Priority Data

May 17, 1968 France .......................... 56102

[52] U.S. Cl. .............................. 8/10.2, 8/11, 8/32
[51] Int. Cl. .................................. A61k 7/12
[58] Field of Search ................... 8/10.2, 11; 96/100; 260/326.11

[56] References Cited

UNITED STATES PATENTS 1,780,058 10/1930 Ballauf .......................... 260/326.11
2,196,739 4/1940 Peterson ........................ 96/100 X Primary Examiner—Albert T. Meyers
Assistant Examiner—Vera C. Clarke
Attorney—Holcombe, Wetherill and Brisebois

[57] ABSTRACT

Keratinic fiber dye compositions comprising a para or ortho diamino or amino-hydroxy aromatic or heterocyclic oxidation dye and an indoline derivative coupling agent; and the process of dyeing human hair with this composition and an oxidizing agent.

4 Claims, No Drawings

DYEING HUMAN HAIR WITH OXIDATION BASES AND AN INDOLINE COUPLER

SUMMARY OF THE INVENTION

Compositions comprising oxidation dyes, and particularly ortho- or para-diamine or ortho- or para-amino-hydroxyl derivatives of aromatic or heterocyclic nuclei, are commonly used to dye human hair. In order to vary the shades obtained by using these bases, it has already been suggested that color modifiers or couplers may be used, and particularly aromatic metadiamines, meta aminophenols, di-ketones, and pyrazolones.

The present invention relates to a new class of couplers which may be used with known oxidation dyes. The couplers are known compounds, but have not heretofore been used as couplers with oxidation dyes.

It is a further object of the present invention to provide the new article of manufacture which consists of a composition for dyeing keratinic fibers and particularly human hair, which is essentially characterized by the fact that it contains:

1. At least one base consisting of an oxidation dye selected from the group consisting of those compounds the molecule of which includes an aromatic or heterocyclic nucleus carrying two amino groups or an amino group and a hydroxyl group in ortho or para position with respect to each other;
2. At least one coupler consisting of an indoline corresponding to the general formula:

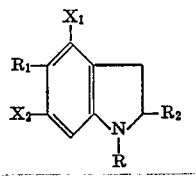

in which R and $R_2$ represents a hydrogen atom or a lower alkyl radical having one to six carbon atoms, $X_1$ represents a hydroxyl radical or an amino radical when $X_2$ represents a hydrogen atom, and vice versa, $X_2$ represents a hydroxyl radical or an amino radical when $X_1$ represents a hydrogen atom, $R_1$ represents a hydrogen atom or a lower alkyl radical, but necessarily representing a hydrogen atom when $X_2$ is different from a hydrogen atom. The coupler may also be an acid salt of such an indoline, and specifically a halohydric acid salt.

Among the bases which may advantageously be used with the couplers according to formula I are:
para-phenylenediamine, para-tolylenediamine, para-aminophenol, N-methyl-para-aminophenol, chloro-para-phenylenediamine, methoxy-para-phenylenediamine, 6-methoxy-3-methyl-para-phenylenediamine, (N-ethyl-N-carbamylmethyl)-para-phenylenediamine, and 2,5-diaminopyridine.

Among the couplers responding to the above formula are: 6-aminoindoline dihydrochloride; 6-hydroxyindoline hydrochloride; 1-ethyl-6-aminoindoline dihydrochloride; and 1-N-ethyl-4-hydroxyindoline hydrobromide. Other suitable couplers are the hydrochlorides and dihydrochlorides of 1-methyl-4-hydroxyindoline, of 1-ethyl-6-hydroxyindoline, or 1-methyl-6-hydroxyindoline and of 2-methyl-6-aminoindoline.

In the hair-dyeing compositions according to the invention the molar ratio of base to coupler may vary from 1:1 to 1:3, but more coupler than base is preferred.

It is important to avoid using an excess of base with respect to the coupler because the base has a tendency to become colored itself, which leads to the superposition of two colors and a defective result. In order to obtain a color resulting solely from the interaction of base and coupler, it is therefore necessary to have as much coupler as base.

The dyeing composition according to the invention may contain other dyes which may be used under the same conditions, such as direct dyes (for example, azo dyes, anthraquinone dyes, and metalliferous dyes) and dyes formed by combining bases and couplers other than those forming the subject matter of the present invention.

The composition according to the invention may also contain wetting agents, dispersing agents, penetrating agents, or ingredients conventionally used in dyeing hair. They may take the form of an aqueous solution, a cream, a gel or an aerosol.

The dyeing composition is used in a conventional manner at an alkaline pH, between 9 and 10 inclusive. This pH value may be obtained by adding ammonia. At a pH below 9 coupling is too slow and an unsatisfactory color results. At above 10 the skin may be irritated. The composition is applied to the hair in the presence of an oxidizing solution suitable for use on human hair and other keratinic fibers, which is preferably a hydrogen peroxide solution.

The compositions according to the invention lead to dyes affording a broad range of colors and having the advantage that they do not change color when exposed to the light or to inclement weather and adhere firmly to the hair.

The following examples are given purely by way of illustration:

EXAMPLE 1

The following dyeing solution is prepared:

| | |
|---|---|
| N-ethyl-4-hydroxyindoline hydrobromide | 1 g. |
| 1,4-diamino-2-methoxybenzene | 1 g. |
| Resorcin | 0.3 g. |
| Para-tolylenediamine | 0.2 g. |
| 20% ammonia | 10 cc. |
| Sodium sulfite | 0.5 g. |
| Ethylenediaminetetraacetic acid | 0.2 g. |
| 20% lauryl, ammonium sulfate | 20 g. |
| Water, q.s.p. | 100 g. |

This solution is mixed with an equal quantity of 6% hydrogen peroxide. When this is applied to 100% white hair, the hair is well covered with a long lasting green color at the end of 30 minutes.

EXAMPLE 2

The following dyeing solution is prepared:

| | |
|---|---|
| N-ethyl-4-hydroxyindoline hydrobromide | 1.5 g. |
| 1,4-diamino-2-methoxy-5-methylbenzene | 0.7 g. |
| Resorcin | 0.2 g. |
| 20% lauryl ammonium sulfate | 20 g. |
| Para-tolylenediamine | 0.3 g. |
| 20% ammonia | 10 cc. |
| Sodium sulfite | 0.5 g. |
| Ethylenediaminetetraacetic acid | 0.2 g. |
| Water q.s.p. | 100 g. |

This solution, when mixed with an equal quantity of 6% hydrogen peroxide, and applied to white hair for half an hour, imparts thereto an intense teal blue, which is light-stable.

EXAMPLE 3

The following dyeing solution is prepared:

| | |
|---|---|
| N-ethyl-4-hydroxyindoline hydrobromide | 1.5 g. |
| Para-tolylenediamine | 0.7 g. |
| Resorcin | 0.2 g. |
| 20% ammonia | 10 cc. |
| Sodium sulfite | 0.5 g. |
| Ethylenediaminetetraacetic acid | 0.2 g. |
| 20% lauryl ammonium sulfate | 20 g. |
| Water q.s.p. | 100 g. |

This solution is mixed with an equal quantity of 6% hydrogen peroxide. When applied to 100% white hair for half an hour, it imparts thereto a deep chestnut coloration.

EXAMPLE 4

The following hair dyeing solution is prepared:

| | |
|---|---|
| 6-aminoindoline | 1.5 g. |
| Para-aminophenol | 1 g. |

| | |
|---|---|
| Resorcin | 0.5 g. |
| 20% ammonia | 10 cc. |
| Sodium sulfite | 0.5 g. |
| Ethylenediaminetetraacetic acid | 0.2 g. |
| 20% lauryl ammonium sulfate | 20 g. |
| Water q.s.p. | 100 g. |

This solution is mixed with an equal quantity of 6% hydrogen peroxide. When applied to 100% white hair for a period of 30 minutes, the result is a mahogany coloration.

EXAMPLE 5

The following dyeing solution is prepared:

| | |
|---|---|
| 6-aminoindoline | 1.5 g. |
| Para-tolylenediamine | 1.2 g. |
| 20% ammonia | 10 cc. |
| Sodium sulfite | 0.5 g. |
| Ethylenediaminetetraacetic acid | 0.2 g. |
| 20% lauryl ammonium sulfate | 20 g. |
| Water q.s.p. | 100 g. |

This solution, when mixed with an equal quantity of 6% hydrogen peroxide, and applied for half an hour to white hair, produces a blue-black coloration.

EXAMPLE 6

The following dyeing solution is prepared:

| | |
|---|---|
| Para-tolylenediamine | 1 g. |
| Para-aminophenol | 0.5 g. |
| Resorcin | 0.1 g. |
| 6-aminoindoline dihydrochloride | 2 g. |
| Lauryl ammonium sulfate with 20% fatty alcohol | 20 g. |
| Ethylenediaminetetraacetic acid sold under the trademark TRILON B | 0.3 g. |
| 20% ammonia | 10 g. |
| 40% sodium bisulfite | 1 g. |
| Water q.s.p. | 100 g. |

This solution when mixed with an equal weight of 6% hydrogen peroxide and applied for about 30 minutes to 100% white hair, produces a golden chestnut coloration.

EXAMPLE 7

The following dyeing solution is prepared:

| | |
|---|---|
| Para-tolylenediamine | 1 g. |
| Para-aminophenol | 0.5 g. |
| Resorcin | 0.1 g. |
| 6-hydroxyindoline hydrochloride | 2 g. |
| Lauryl ammonium sulfate with 20% fatty alcohol | 20 g. |
| Ethylenediaminetetraacetic acid sold under the trade name TRILON B | 0.3 g. |
| 20% ammonia | 10 g. |
| 40% sodium bisulfite | 1 g. |
| Water q.s.p. | 100 g. |

This solution, when mixed with an equal weight of 6% hydrogen peroxide and applied for 30 minutes to 100% white hair, produces a golden chestnut coloration.

EXAMPLE 8

The following dyeing solution is prepared:

| | |
|---|---|
| Para-tolylenediamine | 1 g. |
| Para-aminophenol | 0.5 g. |
| Resorcin | 0.1 g. |
| 1-ethyl-6-aminoindoline dihydrochloride | 2 g. |
| Lauryl ammonium sulfate with 20% fatty alcohol | 20 g. |
| Ethylenediaminetetraacetic acid, sold under the trade name TRILON B | 0.3 g. |
| 20% ammonia | 10 g. |
| 40% sodium bisulfite | 1 g. |
| Water q.s.p. | 100 g. |

This solution, when mixed with an equal quantity of 6% hydrogen peroxide, and applied for 30 minutes to 100% white hair, produces a golden chestnut coloration.

What is claimed is:

1. A process for dyeing hair comprising applying to said hair in amounts effective to dye said hair a hair dye composition comprising an aqueous solution of an oxidation dye having a nucleus selected from the group consisting of phenyl and pyridine carrying as substituents in ortho or para position to each other (1) two amino or (2) one amino and one hydroxy, and an indoline coupler having the formula

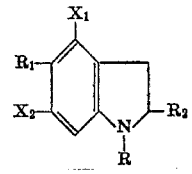

wherein R and $R_2$ each independently are selected from the group consisting of hydrogen and lower alkyl, one of $X_1$ and $X_2$ is selected from the group consisting of hydroxy and amino and the other is hydrogen and $R_1$ is selected from the group consisting of hydrogen and lower alkyl and must be hydrogen when $X_2$ is other than hydrogen, the mole ratio of said oxidation dye to said coupler ranging between 1:1 to 1:3, said composition being applied in the presence of hydrogen peroxide as an oxidizing agent.

2. The process of claim 1 wherein said hair dye composition has a pH of 9–10.

3. The process of claim 1 wherein said oxidation dye is selected from the group consisting of para-phenylenediamine, para-tolylenediamine, para-aminophenol, N-methyl-para-aminophenol, chloro-para-phenylenediamine, methoxypara-phenylenediamine, 6-methoxy-3-methyl-para-phenylenediamine, (N-ethyl-N-carbamylmethyl)-para-phenylenediamine, 1,4-diamine-2-methoxybenzene, 1,4-diamino-2-methoxy-5-methylbenzene and 2,5-diaminopyridine.

4. The process of claim 1 wherein said coupler is selected from the group consisting of 6-hydroxyindoline hydrochloride, 1-ethyl-6-aminoindoline dihydrochloride, 1-N-ethyl-4-hydroxyindolinè hydrobromide, 6-aminoindoline and its dihydrochloride, the hydrochloride and dihydrochloride of 1-methyl-4-hydroxyindoline, of 1-ethyl-6-hydroxyindoline, of 1-methyl-6-hydroxyindoline and 2-methyl-6-aminoindoline.

* * * * *